United States Patent
Basu Mallick et al.

(10) Patent No.: US 10,904,772 B2
(45) Date of Patent: Jan. 26, 2021

(54) PERFORMING AN ACTION BASED ON A NUMBER OF TRANSMISSIONS REACHING A THRESHOLD

(71) Applicant: Motorola Mobility LLC, Chicago, IL (US)

(72) Inventors: Prateek Basu Mallick, Langen (DE); Joachim Loehr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 265 days.

(21) Appl. No.: 15/981,169

(22) Filed: May 16, 2018

(65) Prior Publication Data

US 2018/0343572 A1 Nov. 29, 2018

Related U.S. Application Data

(60) Provisional application No. 62/510,646, filed on May 24, 2017.

(51) Int. Cl.
*H04W 24/02* (2009.01)
*H04W 74/08* (2009.01)
(Continued)

(52) U.S. Cl.
CPC .......... *H04W 24/02* (2013.01); *H04W 48/02* (2013.01); *H04W 72/06* (2013.01);
(Continued)

(58) Field of Classification Search
None
See application file for complete search history.

(56) References Cited

U.S. PATENT DOCUMENTS

| | | | |
|---|---|---|---|
| 2010/0080135 A1* | 4/2010 | Ishii | H04B 7/2637 370/252 |
| 2010/0240377 A1* | 9/2010 | De Pasquale | H04W 28/16 455/445 |

(Continued)

OTHER PUBLICATIONS

PCT/US2018/032965, "Notification of Transmittal of the International Search Report and the Written Opinion of the International Searching Authority, or the Declaration".

*Primary Examiner* — Hassan A Phillips
*Assistant Examiner* — Gautam Sharma
(74) *Attorney, Agent, or Firm* — Kunzler Bean & Adamson

(57) ABSTRACT

Apparatuses, methods, and systems are disclosed for performing an action based on a number of transactions reaching a threshold. One method includes determining whether a number of transmissions to a network unit has reached a predetermined threshold. The method includes, in response to the number of transmissions to the network unit reaching the predetermined threshold, performing an action selected from a group including: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit.

20 Claims, 9 Drawing Sheets

(51) Int. Cl.

| | |
|---|---|
| *H04W 48/02* | (2009.01) |
| *H04W 72/06* | (2009.01) |
| *H04W 72/08* | (2009.01) |
| H04L 5/00 | (2006.01) |
| H04W 48/08 | (2009.01) |

(52) U.S. Cl.
CPC ..... *H04W 72/085* (2013.01); *H04W 74/0833* (2013.01); *H04L 5/0048* (2013.01); *H04W 48/08* (2013.01)

(56) References Cited

U.S. PATENT DOCUMENTS

| | | | | |
|---|---|---|---|---|
| 2012/0069788 A1* | 3/2012 | Shen | ............ | H04W 74/006 370/315 |
| 2012/0176967 A1* | 7/2012 | Kim | ............ | H04W 76/36 370/328 |
| 2013/0039294 A1* | 2/2013 | Wang | ............ | H04W 74/04 370/329 |
| 2013/0083749 A1 | 4/2013 | Xu et al. | | |
| 2013/0095879 A1* | 4/2013 | Gupta | ............ | H04W 76/18 455/525 |
| 2013/0143547 A1* | 6/2013 | Ye | ............ | H04W 74/0841 455/422.1 |
| 2013/0188473 A1 | 7/2013 | Dinan | | |
| 2014/0056243 A1* | 2/2014 | Pelletier | ............ | H04L 5/0032 370/329 |
| 2014/0161086 A1* | 6/2014 | Tamura | ............ | H04W 72/14 370/329 |
| 2014/0177607 A1* | 6/2014 | Li | ............ | H04B 7/0695 370/336 |
| 2015/0373687 A1* | 12/2015 | Callard | ............ | H04L 67/34 370/329 |
| 2016/0029324 A1 | 1/2016 | Jang et al. | | |
| 2017/0099675 A1* | 4/2017 | Gineste | ............ | H04W 72/1263 |
| 2018/0013524 A1* | 1/2018 | Chien | ............ | H04W 48/14 |
| 2018/0077645 A1* | 3/2018 | Yan | ............ | H04W 4/70 |

* cited by examiner

700

PERFORMING AN ACTION BASED ON A NUMBER OF TRANSMISSIONS REACHING A THRESHOLD

CROSS-REFERENCE TO RELATED APPLICATIONS

This application claims priority to U.S. Provisional Patent Application Ser. No. 62/510,646 entitled "MAX PREAMBLE TRANSMISSIONS AND BACKOFF ISSUES FOR ON DEMAND SI REQUEST" and filed on May 24, 2017 for Prateek Basu Mallick which is incorporated herein by reference in its entirety.

FIELD

The subject matter disclosed herein relates generally to wireless communications and more particularly relates to performing an action based on a number of transactions reaching a threshold.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cell Radio Network Temporary Identifier ("C-RNTI"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Identifier ("ID"), Internet-of-Things ("IoT"), Licensed Assisted Access ("LAA"), Load Based Equipment ("LBE"), Listen-Before-Talk ("LBT"), Long Term Evolution ("LTE"), Medium Access Control ("MAC"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), New Radio ("NR"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Protocol Data Unit ("PDU"), Physical Hybrid ARQ Indicator Channel ("PHICH"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Failure ("RLF"), Radio Resource Control ("RRC"), Random Access Procedure ("RACH"), Random Access Response ("RAR"), Random Access Radio Network Temporary Identity ("RA-RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Timing Advanced Group ("TAG"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, some system information may be transmitted and/or received more often than is necessary. In certain configurations, to reduce the signaling load for providing system information, a minimum amount of system information may be used. The minimum system information ("SI") may contain basic information for initial access to the cell (e.g., subframe number, list of public land mobile networks ("PLMNs"), cell camping parameters, RACH parameters) that is broadcast periodically in a cell. In some configurations, the other non-minimum SI doesn't necessarily need to be periodically broadcast (e.g., it may be a network decision). In various configurations, the other SI may be provided on-demand to UEs (e.g., a UE may request it). Delivery of other SI may be done in a broadcast or unicast manner. In some configurations, the minimum SI may indicate whether a specific SIB is periodically broadcasted or provided on-demand. To obtain the one or more SIBs which are not periodically broadcasted and are provided on-demand, a UE may initiate an on-demand SI acquisition procedure (e.g., SI request). For an SI used by the UE, the UE may determine whether it is available in the cell and whether it is broadcast or not before it sends a request for it. The scheduling information for other SI may be provided by the minimum SI (e.g., an SIB type, validity information, periodicity, SI-window information, etc.).

In various configurations, a UE may not be aware whether an SI request is correctly detected by a gNB and may unnecessarily monitor during the SI window for the delivery of the requested SI. Accordingly, a UE battery may drain unnecessarily and there may be an increase in latency for the SI provisioning.

BRIEF SUMMARY

Methods for performing an action based on a number of transactions reaching a threshold are disclosed. Apparatuses and systems also perform the functions of the apparatus. In one embodiment, the method includes determining whether a number of transmissions to a network unit has reached a predetermined threshold. In certain embodiments, the method includes, in response to the number of transmissions to the network unit reaching the predetermined threshold, performing an action selected from a group including: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit.

An apparatus for performing an action based on a number of transactions reaching a threshold, in one embodiment, includes a processor that: determines whether a number of transmissions to a network unit has reached a predetermined threshold; and in response to the number of transmissions to the network unit reaching the predetermined threshold, performs an action selected from a group including: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit.

In one embodiment, a method for performing an action based on a number of transactions reaching a threshold includes determining an action selected from a group including: inhibiting communications with a network unit; determining a type of system information being requested by a number of transmissions and inhibiting communications with the network unit based on the type of system information; determining whether to inhibit communications with the network unit based on a configuration of a remote unit; and performing additional transmissions to the network unit. In various embodiments, the method includes transmitting information corresponding to the selected action.

An apparatus for performing an action based on a number of transactions reaching a threshold, in one embodiment, includes a processor that determines an action selected from a group including: inhibiting communications with a network unit; determining a type of system information being requested by a number of transmissions and inhibiting communications with the network unit based on the type of system information; determining whether to inhibit communications with the network unit based on a configuration of a remote unit; and performing additional transmissions to the network unit. In some embodiments, the apparatus includes a transmitter that transmits information corresponding to the selected action.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
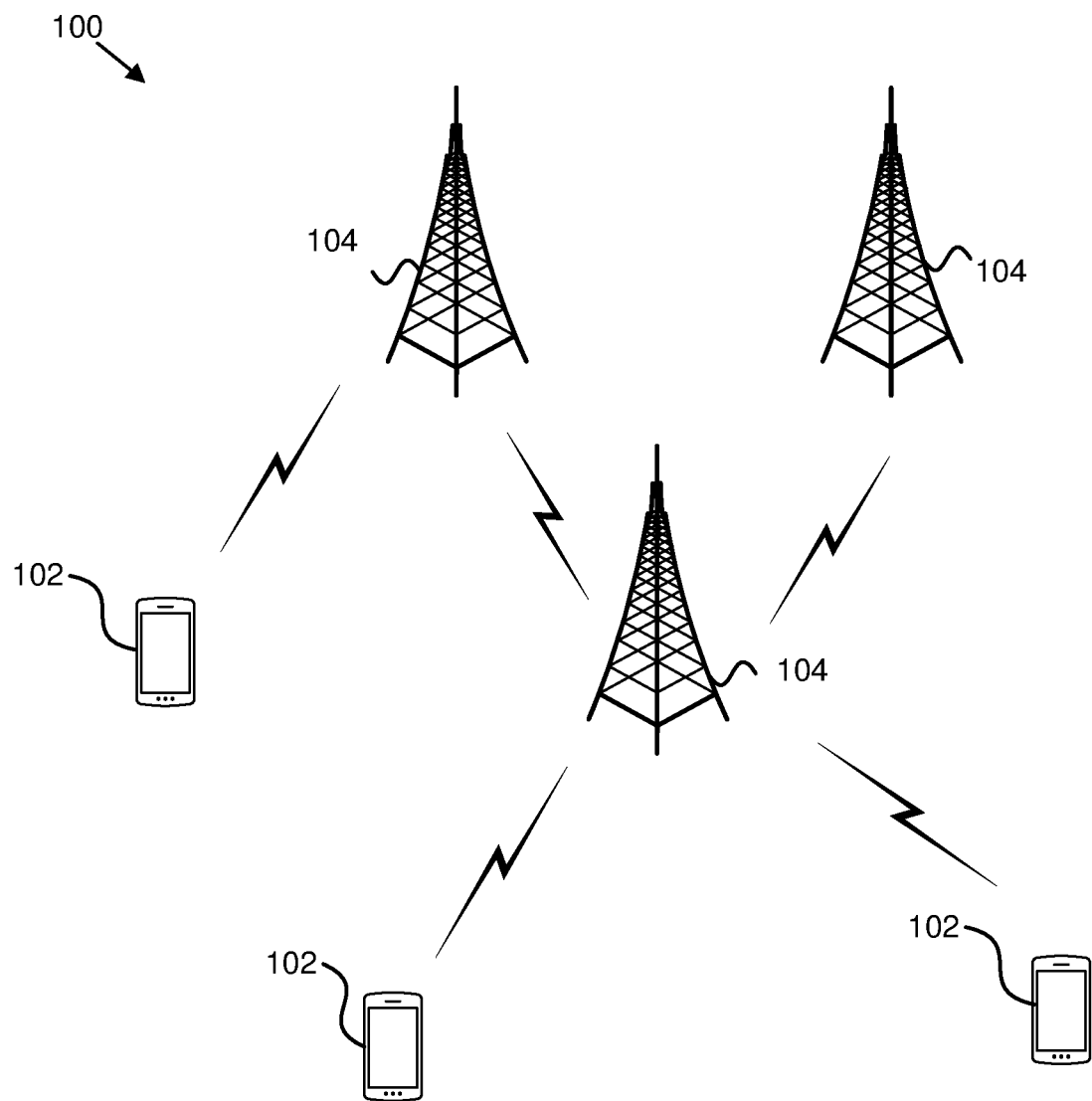
FIG. 1 is a schematic block diagram illustrating one embodiment of a wireless communication system for performing an action based on a number of transactions reaching a threshold.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for performing an action based on a number of transactions reaching a threshold. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a network unit 104 may determine an action selected from a group including: inhibiting communications with the network unit 104; determining a type of system information being requested by a number of transmissions and inhibiting communications with the network unit 104 based on the type of system information; determining whether to inhibit communications with the network unit 104 based on a configuration of a remote unit 102; and performing additional transmissions to the network unit 104. In various embodiments, the network unit 104 may transmit information corresponding to the selected action. Accordingly, a network unit 104 may be used for performing an action based on a number of transactions reaching a threshold.

In another embodiment, a remote unit 102 may determine whether a number of transmissions to a network unit 104 has reached a predetermined threshold. In certain embodiments, the remote unit 102 may, in response to the number of transmissions to the network unit 104 reaching the predetermined threshold, perform an action selected from a group including: inhibiting communications with the network unit 104; determining a type of system information being requested by the number of transmissions and inhibiting communications with the network unit 104 based on the type of system information; determining whether to inhibit communications with the network unit 104 based on a configuration of the remote unit 102; and performing additional transmissions to the network unit 104. Accordingly, a remote unit 102 may be used for performing an action based on a number of transactions reaching a threshold.

Figure 2:
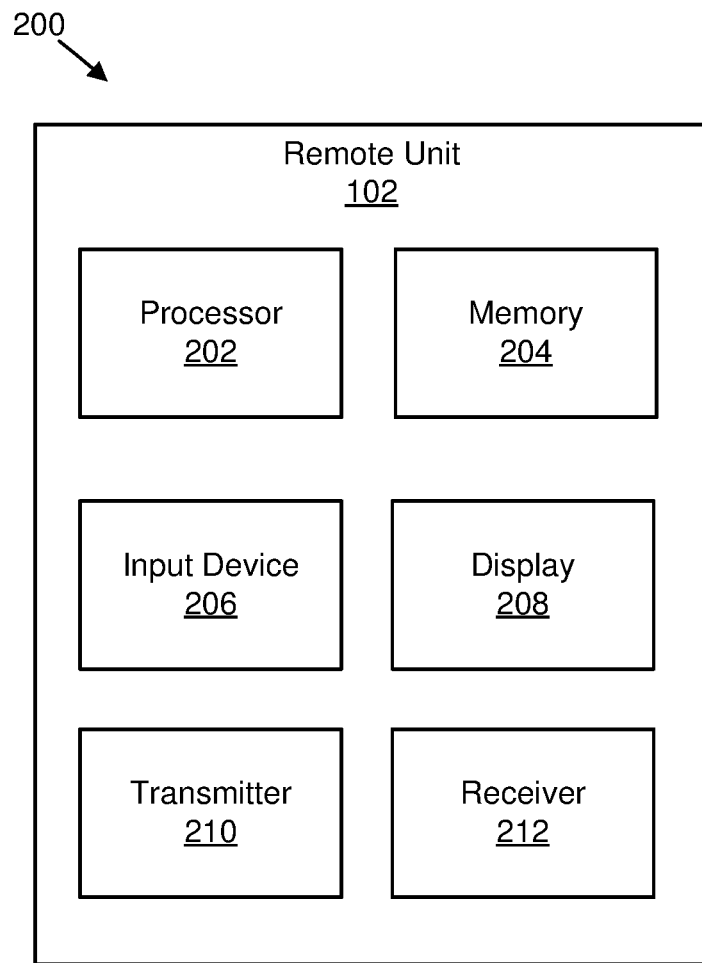
FIG. 2 is a schematic block diagram illustrating one embodiment of an apparatus that may be used for performing an action based on a number of transactions reaching a threshold.

FIG. 2 depicts one embodiment of an apparatus 200 that may be used for performing an action based on a number of transactions reaching a threshold. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines whether a number of transmissions to a network unit has reached a predetermined threshold; and in response to the number of transmissions to the network unit reaching the predetermined threshold, performs an action selected from a group including: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system information. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
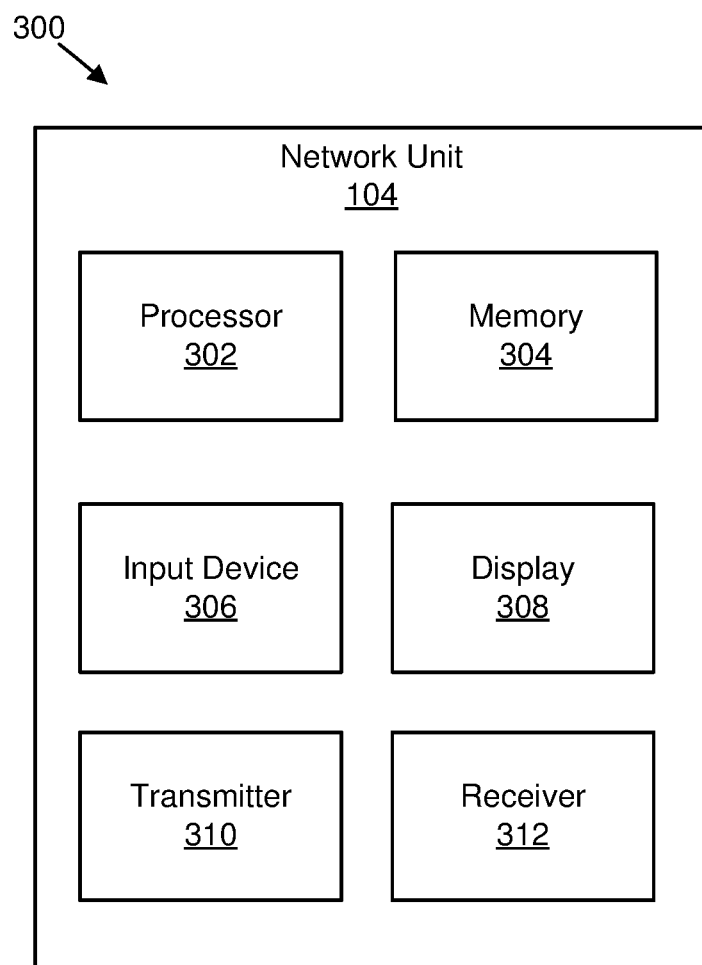
FIG. 3 is a schematic block diagram illustrating one embodiment of an apparatus that may be used for performing an action based on a number of transactions reaching a threshold.

FIG. 3 depicts one embodiment of an apparatus 300 that may be used for performing an action based on a number of transactions reaching a threshold. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 may determine an action selected from a group including: inhibiting communications with a network unit; determining a type of system information being requested by a number of transmissions and inhibiting communications with the network unit based on the type of system information; determining whether to inhibit communications with the network unit based on a configuration of a remote unit; and performing additional transmissions to the network unit. In some embodiments, the transmitter 310 may transmit information corresponding to the selected action. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
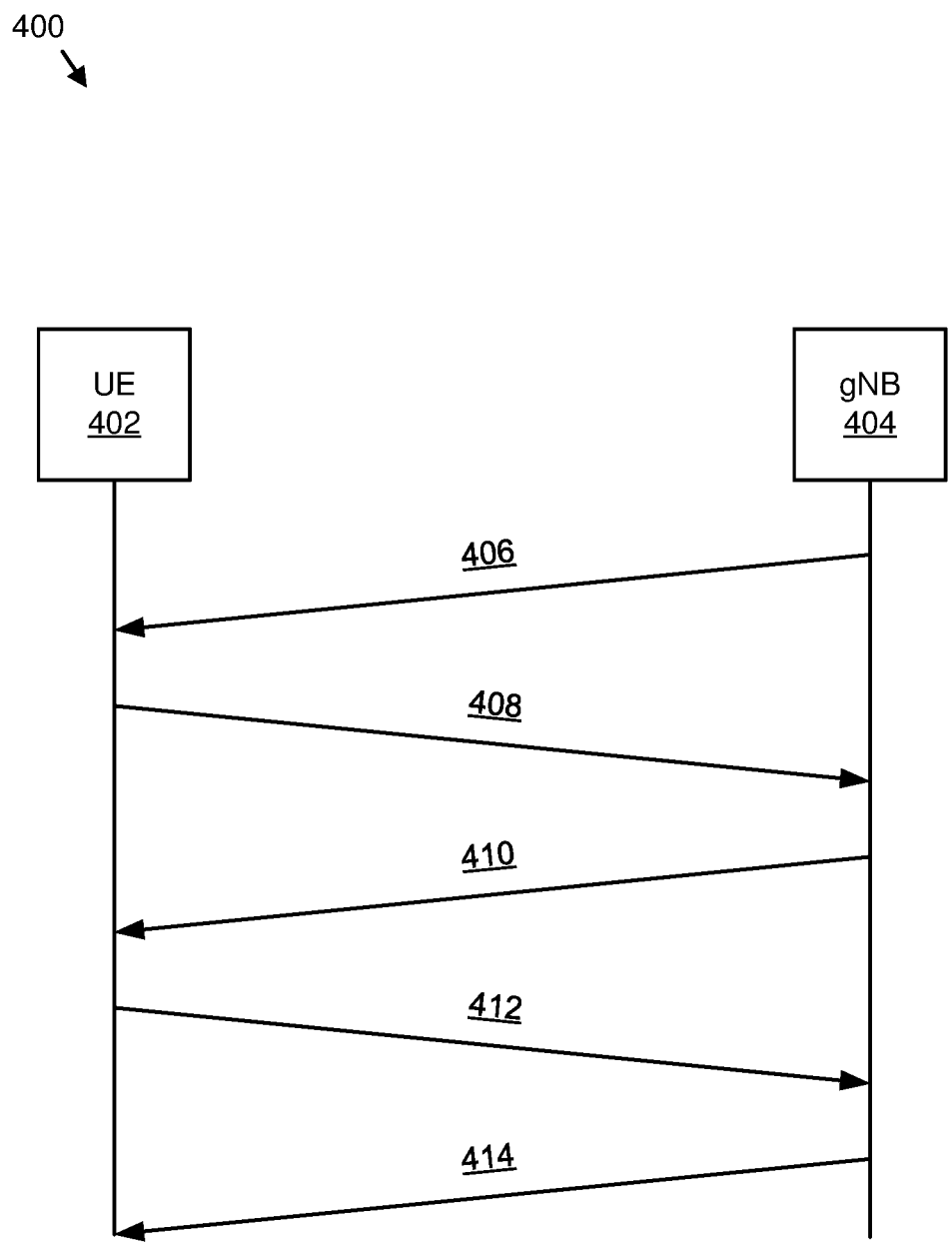
FIG. 4 illustrates one embodiment of communications for transmitting and receiving feedback for a system information request.

FIG. 4 illustrates one embodiment of communications 400 for transmitting and receiving feedback for a system information request. Specifically, communications 400 between a UE 402 and a gNB 404 are illustrated. The communications 400 may facilitate the UE 402 requesting on-demand SIBs using a RACH message 3 based approach.

In certain embodiments, the gNB 404 may transmit a periodic broadcast 406 to the UE 402. The periodic broadcast 406 may include minimum SI used by the UE 402 for communication. In various embodiments, the UE 402 may transmit a PRACH preamble 408 to the gNB 404. In some embodiments, in response to transmitting the PRACH preamble 408, the gNB 404 may transmit an UL grant in a random access response 410. After receiving the random access response 410, the UE 402 may transmit a system information ("SI") request 412 to the gNB 404 that indicates on-demand SIBs requested by the UE 402. The system information request 412 may be a random access message 3. As may be appreciated, the on-demand SIBs may not be broadcast (e.g., transmitted) unless requested. In response to the system information request 412, the gNB 404 may transmit a feedback response 414 that indicates that the system information request 412 was received by the gNB 404.

In certain embodiments, because message 3 is a UL-SCH transmission (e.g., medium access control ("MAC") protocol data unit ("PDU")) more information may be provided by the UE 402 within the message 3 than in a PRACH preamble. In one embodiment, the UE 402 includes a MAC control element ("CE") within the RACH message 3 to convey the SI request information. In such an embodiment, the MAC CE may contain a bitmap indicating the SI(s)/SIB(s) that the UE 402 wants to acquire. Moreover, the bitmap may have an entry for all on-demand SI(s)/SIB(s) (e.g., all SIBs not broadcast in the cell). Using the bitmap, the UE 402 may indicate (e.g., by setting the corresponding field/bit to a predefined value) which of the SI(s)/SIB(s) it wants to acquire. In certain embodiments, the UE 402 requests system information not only for the current cell, (e.g., cell UE is camped on/connected with) but also for neighboring cells. In one embodiment, the UE 402 includes information within the message 3 (e.g., SI request message) which indicates that the gNB 404 should provide to UE 402 all system information used in a predetermined area, covering one or multiple cells. In certain embodiments, the UE 402 may include an RRC message within the message 3 to convey SI request information. In such an embodiment, the RRC message may contain the SI(s)/SIB(s) that the UE 402 wants to acquire.

In various embodiments, some SI may be related to the UE's 402 capability and so indicating such capability might provide useful information to the gNB 404 as to whether related SI information is to be transmitted to the UE 402 in response or not. In certain embodiments, to allow the gNB 404 to allocate sufficient uplink resources for transmission of the SI-request bitmap MAC CE in message 3, one or more PRACH preambles may be used to indicate that the purpose of the RACH procedure is for on-demand SI acquisition. In various embodiments, the size of message 3 (e.g., the system information request 412) might be different for an initial Access and an SI-request (e.g., message 3 for on-demand SI acquisition may only include the system information request message, but no further information like an identity identifying the UE or some buffer status report). In certain embodiments the content of the RACH response message (e.g., RACH message 2), which is sent by gNB in response to receiving a PRACH preamble may be different for a RACH procedure with the purpose for on-demand SI acquisition than for a RACH procedure for another purpose. In some embodiments, because more than one UE may send an identical reserved PRACH preambles for SI request, a collision of message 3 may occur (e.g., multiple UEs are sending SI-request MAC CE (with different content) on UL resources allocated in RACH message 3). Accordingly, in certain embodiments, collision/contention resolution may be used to enable the UE 402 to know whether the transmitted SI request was received by gNB 404. In one embodiment, the gNB 404 may send in RACH message 4 (e.g., the feedback response 414) the SI-request bitmap MAC CE which it received in message 3. This will enable the UE 402 to identify whether its SI-request was correctly received by the gNB 404. In various embodiments, the gNB 404 could include the requested SIB(s)/SI(s) in the RACH message 4 as part of the feedback response 414 (e.g., RRC message). In some embodiments, upon reception of RACH message 4, the UE 402 may check, by decoding the MAC CE, whether the requested SIB(s)/SI(s) are included (e.g., checking whether the received MAC CE matches the SI-request MAC CE sent in message 3). In embodiments in which the MAC CE matches the SI-request MAC CE, the SIB(s)/SI(s) may be delivered to the RRC. In embodiments in which the MAC CE does not match the request, the UE 402 may trigger the SI acquisitions procedure again (e.g., sending PRACH preamble for SI-request, retransmitting the message 3, etc.). Moreover, the UE 402 may, upon transmission of message 3, monitor (e.g., during a certain time window, during a predetermined period of time) for a RACH message 4. In situations in which no RACH message 4 is received during the predetermined period of time the UE 402 may trigger the SI acquisition procedure again (e.g., sending PRACH preamble for SI-request, retransmitting the message 3, etc.).

In various embodiments, the SIB(s)/SI(s) requested by the UE 402 may be broadcast (instead of sending them in message 4). In such embodiments, the RACH message 4 may include the scheduling information which indicates the timing information for the broadcast of the requested SIB(s)/SI(s). Furthermore, in such embodiments, the UE 402 may not read minimum system information in order to acquire the timing information before receiving the broadcasted SIB(s)/SI(s).

In various embodiments, SIB(s)/SI(s) requested by the UE 402 may be partly provided by broadcast and partly within RACH message 4. In one embodiment, the RACH message 4 may include information indicating which SI(s)/SIB(s) are provided by RACH message 4 and which SI(s)/SIB(s) are broadcast (e.g., the UE 402 monitors during the SI window associated with these SI(s)/SIB(s) for receiving the broadcast channel).

In one embodiment, the gNB 404 may send multiple RACH message 4 (e.g., to be provided SI(s)/SIB(s) may not fit within only one downlink transmission). In certain embodiments, an indication is contained within the RACH message 4 (e.g., SI feedback response) indicating whether the UE 402 should continue monitoring for further downlink transmissions (e.g., further RACH message 4 transmissions) for reception of further SI(s)/SIB(s) or whether UE may stop monitoring for further downlink transmissions (e.g., further RACH message 4 transmissions). In one embodiment, this indication is a boolean flag. In various embodiments, the RACH message 4 may include information indicating whether the UE 402, in response to receiving the RACH message, should initiate an RRC connection establishment procedure or an RRC connection resume procedure.

As may be appreciated, one advantage of including the SI-request bitmap MAC CE in message 4 is that collision/contention resolution may be performed on the MAC level. In certain embodiments, the UE 402 may, after sending RACH message 3 and upon receiving a HARQ acknowledgment as the feedback response 414, read the minimum SI and check whether the gNB 404 indicates that the requested SIBs are in response to having received the SI request broadcast in the cell. In such an embodiment, the collision/contention resolution would happen at the minimum SI level.

In some embodiments, the radio network temporary identifier ("RNTI") used for RACH message 4 transmission may indicate the on-demand SIB(s) which are either included in message 4 (e.g., RRC message) or being broadcast. In such embodiments, a certain number of RNTI(s) (e.g., from the cell RNTI ("C-RNTI") space) may be reserved and associated to a specific SIB or a combination of several SIB(s). Moreover, the UE 402 may, upon transmission of message 3, monitor (e.g., during a certain time window, during a predetermined period of time) for a PDCCH addressed to one of those reserved RNTIs. Accordingly, depending on the received PDCCH/RNTI (e.g., the feedback response 414) the UE 402 may be aware of whether its SI request sent in message 3 was received by the gNB 404. In various embodiments, the RNTI used for RACH message 4 may be a common predefined RNTI value. In such embodiments, a common predefined RNTI is used which is specific to the SI-request. Moreover, in such embodiments, no temporary cell RNTI ("T-CRNTI") needs to be allocated/signalled in the RACH response message. In embodiments in which a common RNTI is used, the RACH message 4 (e.g., SI feedback message) may not only be addressed to a single UE but may be addressed to multiple UEs which sent a SI request. As such, each UE which sent a SI request may check based on the common RNTI, whether its request was received by gNB 404. In embodiments in which a common RNTI is used for RACH message 4, the SI feedback message conveyed within RACH message 4 may contain a bitmap which denotes the SIB(s) for which gNB 404 has received a request (e.g., multiple requests from different UEs). As such, each UE which sent a SI request may check, based on the received bitmap, whether its request was received by the gNB 404. In certain embodiments, UEs which have not sent an SI request may monitor for the common RNTI in order to receive the SI feedback message (e.g., RACH message 4) and check the requested SIB(s) so that a UE may not need to request SIB(s) which have been already requested by other UEs.

In certain embodiments described herein, the RACH procedure may be used for the sole purpose of requesting on-demand SI. However, in some embodiments, the UE 402 may establish an RRC connection and at the same request on-demand SI, or the UE 402 in an inactive state may transmit UL data and at the same time trigger an on-demand SI acquisition procedure. In such embodiments, which are just examples, the UE 402 may send the SI-request MAC CE and the RRC connection request message in RACH message 3, or SI-request MAC CE and UL data and potentially some buffer status report ("BSR") MAC CE in RACH message 3. In such embodiments, the gNB 404 may distinguish between the different cases (e.g., SI-request, SI-Request plus initial access, SI-request plus UL data) so that the gNB 404 may dimension the size of the UL grant accordingly. Accordingly, in some embodiments, PRACH preambles may be reserved for identification of the different cases.

Figure 5:
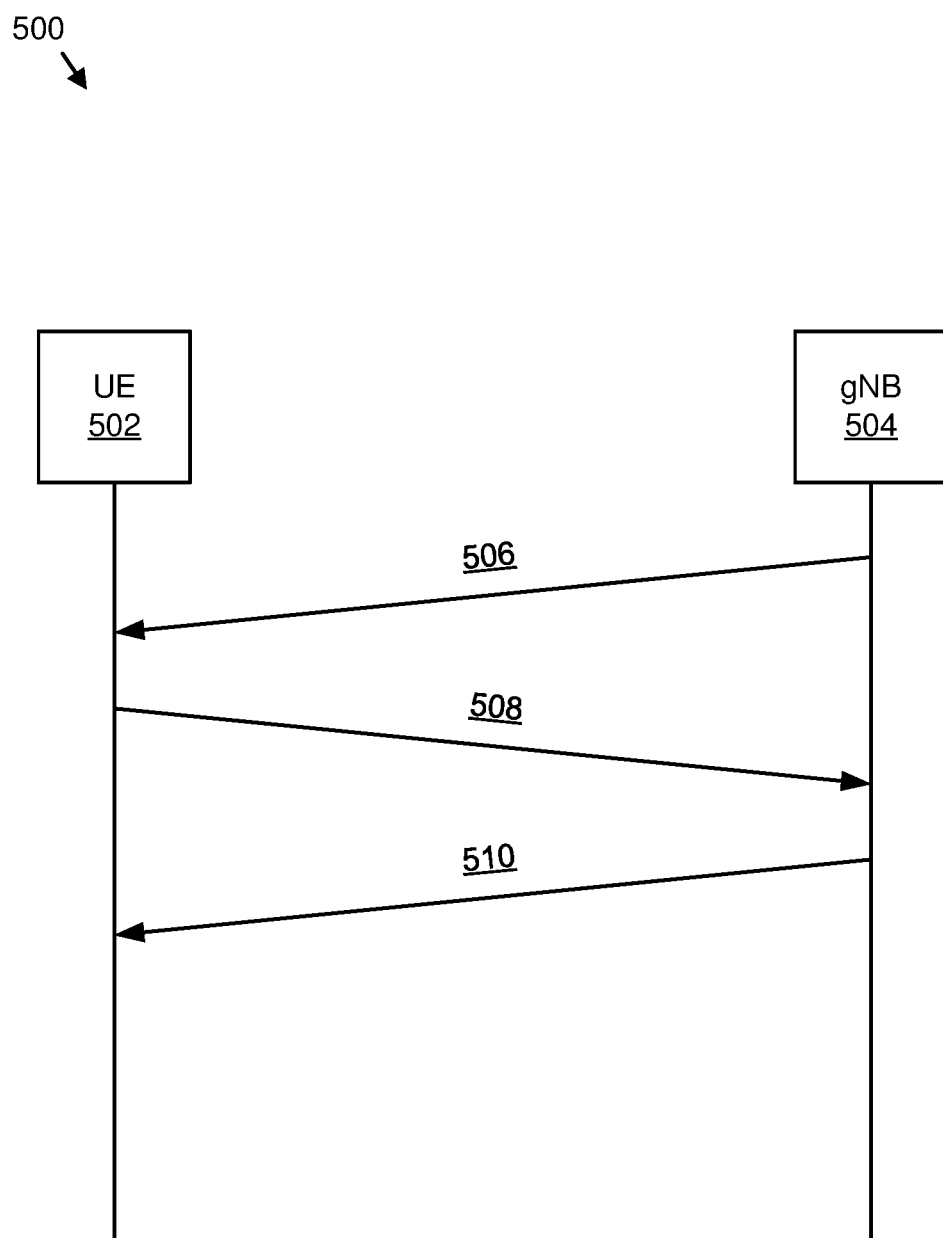
FIG. 5 illustrates another embodiment of communications for transmitting and receiving feedback for a system information request.

FIG. 5 illustrates another embodiment of communications 500 for transmitting and receiving feedback for a system information request. Specifically, communications 500 between a UE 502 and a gNB 504 are illustrated. The communications 500 may facilitate the UE 502 requesting on-demand SIBs using a RACH message 1 based approach.

In certain embodiments, the gNB 504 may transmit a periodic broadcast 506 to the UE 502. The periodic broadcast 506 may include minimum SI used by the UE 502 for communication. In various embodiments, the UE 502 may transmit a PRACH preamble 508 to the gNB 504. The PRACH preamble 508 indicates an SI request to the gNB 504 that indicates on-demand SIBs requested by the UE 502. The PRACH preamble 508 may be a message 1. As may be appreciated, the on-demand SIBs may not be broadcast (e.g., transmitted) unless requested. In response to the PRACH preamble 508, the gNB 504 may transmit a feedback response 510 that indicates that the PRACH preamble 508 was received by the gNB 504.

In certain embodiments, the PRACH preamble 508 is resource specific to an SIB or set of SIBs which the UE 502 wants to obtain. In some embodiments, the PRACH preamble 508 that is resource specific to each SIB or set of SIBs are reserved and indicated in periodically broadcasted minimum SI. In certain embodiments, the UE 502 may request system information not only for the current cell, (e.g., cell UE is camped on/connected with) but also for neighboring cells. In one embodiment, a PRACH preamble 508 indicates that the gNB 504 should provide to UE 502 all system information used in a predetermined area, covering one or multiple cells.

Upon transmission of the PRACH preamble 508 (e.g., the SI request preamble), the UE 502 may monitor for a feedback message (e.g., the feedback response 510) sent from the gNB 504. The UE 502 may monitor for the feedback message during a defined time period (e.g., time window). Upon reception of the feedback message the UE 502 may monitor during a signaled SI window for the requested SI (e.g., as indicated in the scheduling information broadcast in the minimum SI).

In the absence of the feedback message, the UE 502 may assume that the PRACH transmission was not detected by the gNB 504 and may, in certain embodiments, retransmit the PRACH preamble 508 (e.g., SI request). In some embodiments, retransmission of the PRACH preamble 508 may be with an increased transmission power. In various embodiments, a counter is used and is initially set to zero and increased for each PRACH preamble 508 transmission.

In certain embodiments, there may be a maximum number of PRACH preamble 508 transmission attempts defined. In some embodiments, if the maximum number of PRACH preamble 508 transmission attempts is reached the UE 502 may indicate to a higher layer a random access problem (e.g., radio link failure procedure might be started such as for an inactive mode).

In certain embodiments, the UE 502 may make a maximum number of allowed preamble retransmissions. In such embodiments, the maximum number may be defined in a specification and/or configured by a network using broadcast signaling. In various embodiments, upon not receiving any response and/or acknowledgement, a message 2 may indicate a RACH problem to an upper layer. In some embodiments, an upper layer, like RRC in an idle mode, may be unable to make an effective decision according to an LTE specification because the UE 502 is in the RRC idle mode. In certain embodiments, an RRC connected UE 502 may trigger an RLF procedure when a MAC indicates a RACH problem. In various embodiments, RLF may not be possible for an RRC idle UE 502 because there may be no dedicated link. In such embodiments, the UE 502 may continuously lose power as the MAC keeps on transmitting a message 1 and upper layers do not have a specific solution to stop this situation.

Figure 6:
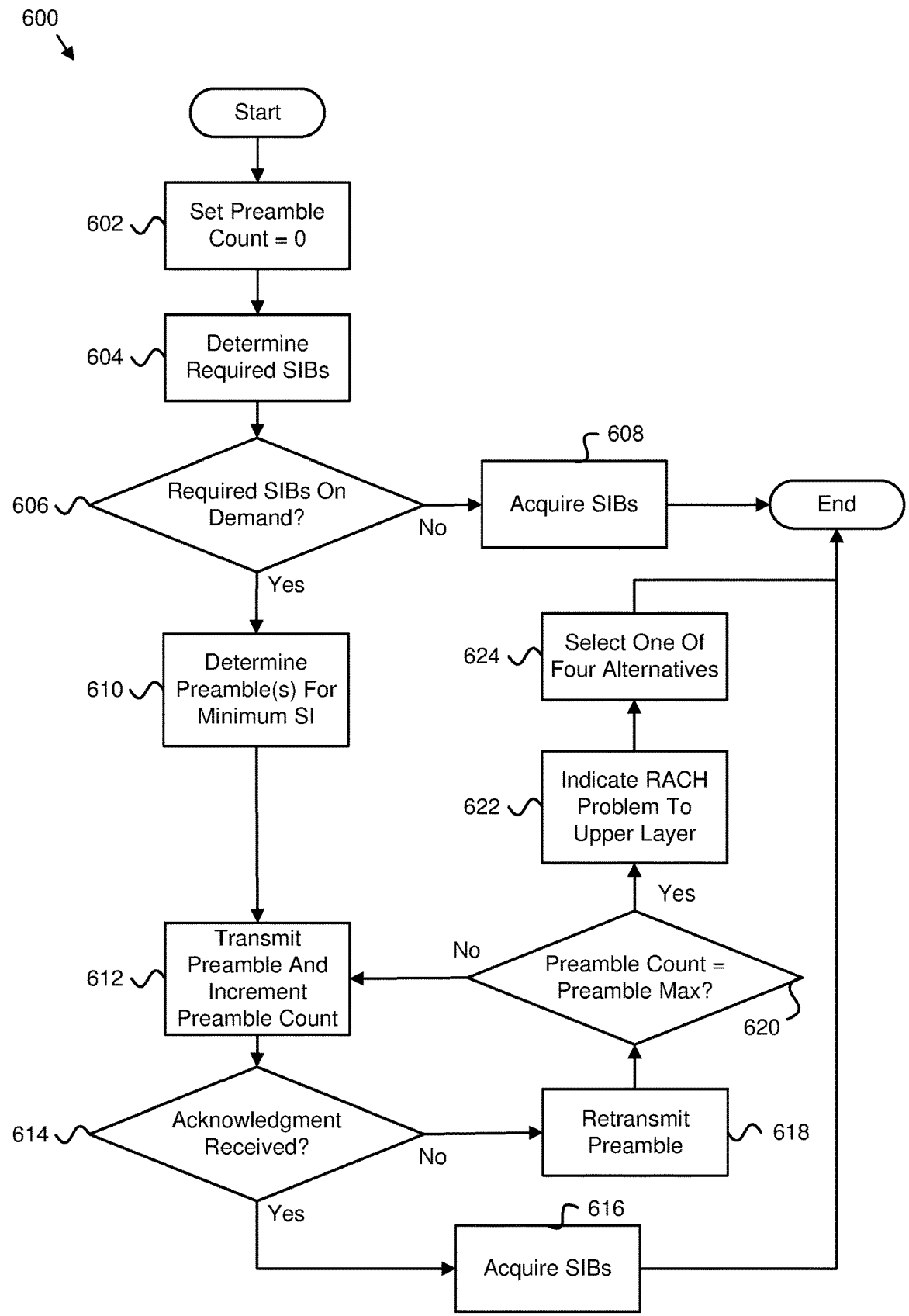
FIG. 6 is a schematic flow chart diagram illustrating one embodiment of a method for performing an action based on a number of transactions reaching a threshold.

FIG. 6 is a schematic flow chart diagram illustrating one embodiment of a method 600 for performing an action based on a number of transactions reaching a threshold. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 includes setting 602 a preamble count equal to zero. Moreover, the method 600 includes determining 604 SIBs required by a remote unit 102. In some embodiments, the method 600 may include determining 606 whether some of the required SIBs are only provided on demand.

In response to determining 606 that none of the require SIBs are only provided on demand, the method 600 may acquire 608 the SIBs as they are broadcast, and the method 600 may end. Moreover, in response to determining 606 that some of the required SIBs are only provided on demand, the method 600 may determine 610 one or more preambles corresponding to the required SIBs that are only available on demand.

In certain embodiments, the method 600 may transmit 612 a preamble corresponding to a required SIB and may increment the preamble count. In various embodiments, the method 600 may determine 614 whether an acknowledgment is received in response to transmitting the preamble. In response to determining 614 that an acknowledgment is received in response to transmitting the preamble, the method 600 may acquire 616 the SIBs, and the method 600 may end.

In response to determining 614 that an acknowledgment is not received in response to transmitting the preamble, the method 600 may retransmit 618 the preamble. In some embodiments, the method 600 may determine 620 whether the preamble count (e.g., number of transmissions) equals a maximum preamble count (e.g., predetermined threshold). In response to determining 620 that the preamble count does not equal the maximum preamble count, the method 600 may return to transmitting 612 the preamble and incrementing the preamble count.

Moreover, in response to determining 620 that the preamble count equals the maximum preamble count (e.g., the number of transmissions has reached the predetermined threshold), the method 600 may indicate 622 a RACH problem to an upper layer. In certain embodiments, the method 600 may select 624 one of four alternatives, and the method 600 may end. The four alternatives may include a first alternative, a second alternative, a third alternative, and a fourth alternative.

In the first alternative, a remote unit 102 may treat a cell as barred (e.g., inhibit communications with a network unit 104). In such embodiments, the barring may be applied for a certain time that can be specified and/or configured using broadcast signaling. In various embodiments, during a time a cell is treated as barred, a corresponding frequency of the cell may be treated as a lowest priority for cell reselection. In certain embodiments, a remote unit 102 may use a different Qoffset value for a cell to facilitate a lower ranking of the cell in cell selection and reselection evaluation (e.g., see 3GPP TS 36.304 v 14.6.0). In some embodiments, barring may be performed for a predetermined period of time (e.g., a barring timer). In response to the cell being barred, the remote unit 102 may select another cell from a different frequency. In various embodiments, in response to a predetermined period of time expiring, the remote unit 102 may use an actual priority of a previously barred cell and may reevaluate cell reselection criteria. In some embodiments, if a cell is reselected after previously being barred, the remote unit 102 may request to receive any required SIBs and/or SI messages.

In the second alternative, a remote unit 102 may inhibit communications with a cell (e.g., network unit 104) based on a type of system information being requested (e.g., the SI and/or SIBs being requested). In certain embodiments, in response to SIs and/or SIBs not being essential SIBs (e.g., according to RRC), the remote unit 102 may refrain from retrying until a certain time elapses (e.g., determined via a prohibit timer). In various embodiments, a prohibit timer may be specified and/or configurable (e.g., in dedicated and/or broadcast signaling). In some embodiments, in response to essential SIBs being requested (e.g., if not all essential SIBs are regularly broadcasted), the remote unit 102 may treat a cell as barred and/or may reselect another cell and/or frequency as described in the first alternative. In certain embodiments, essential SIBs in NR may be similar to SIB types in LTE, or essential SIBs in NR may be different than SIB types in LTE.

In the third alternative, a remote unit 102 may determine whether to inhibit communications with a network unit 104 based on a configuration of the remote unit 102 (e.g., leave a decision about inhibiting communications to remote unit 102 implementation). In certain embodiments, a remote unit 102 may use certain non-essential feature-specific SIBs that are important and/or critical for operation of the remote unit 102. In such embodiments, the remote unit 102 may treat a cell as barred while other remote units 102 may resend an SI request after expiration of a prohibit timer. In various embodiments, a prohibit timer may be specified and/or configurable (e.g., configurable via dedicated and/or broadcast signaling).

In the fourth alternative, a remote unit 102 may perform additional transmissions to a network unit 104 (e.g., do nothing different by a MAC continuing message 1 transmission). In various embodiments, a remote unit 102 internal message 1 (e.g., Msg1) transmission count may be defined and the remote unit 102 may stop message 1 transmission once the transmission count is reached and the RRC layer is informed. For example, the remote unit 102 may transmit the message 1 10 times. In such an embodiment, the remote unit 102 may increase the power for each transmission until a maximum transmission power is reached.

In another alternative, a network may configure one of the above four alternatives and corresponding parameters (e.g., prohibit timer, redirection information towards a certain target frequency, etc.) using dedicated and/or broadcast signaling.

In some embodiments, if a RAR received on RA-RNTI used to send acknowledgements for SI requests contains a backoff indicator subheader, a remote unit 102 may refrain from transmitting a message 1 until an indicated backoff timer expires. In certain embodiments, it may be determined whether any and/or all preambles corresponding to message 1, or any and/or all preambles allocated for SI-request purposes are subjected to the backoff timer. In certain embodiments, all preambles may be subjected to the backoff timer if the network has receiving many SI requests and would rather start broadcasting them all. In various embodiments, the network may not wish to receive any message 1 with or without an SI-request. In various embodiments, the following options may be used for backoff.

In a first option, a remote unit 102 behavior may be specified so that a backoff subheader received on RA-RNTI may be used to send acknowledgements for SI requests. In such embodiments, the remote unit 102 may back off all preamble transmissions irrespective of whether the preamble transmissions include SI requests or not.

In a second option, a remote unit 102 behavior may be specified so that a backoff subheader received on RA-RNTI may be used to send acknowledgements for SI requests. In such embodiments, the remote unit 102 may back off only those preamble transmissions that are reserved for SI requests.

Figure 7:
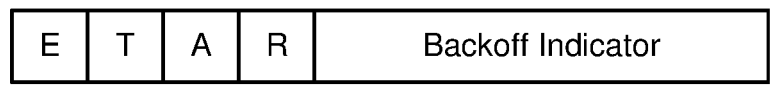
FIG. 7 is a block diagram illustrating one embodiment of a MAC subheader.

In a third option, a remote unit 102 may use a new indication in a backoff MAC subheader to indicate which of the first and second options is to be used. FIG. 7 is a block diagram illustrating one embodiment of a MAC subheader 700. The new indication may be done using one of the reserved bit 'R' and/or 'A' bits illustrated in FIG. 7. In some embodiments, in response to 'A' being set then backoff applies to all preamble transmissions irrespective of whether the preamble transmissions are for SI requests or not; otherwise, in response to the 'A' bit not being set, only those preamble transmissions that are reserved for SI requests may be backed-off.

Figure 8:
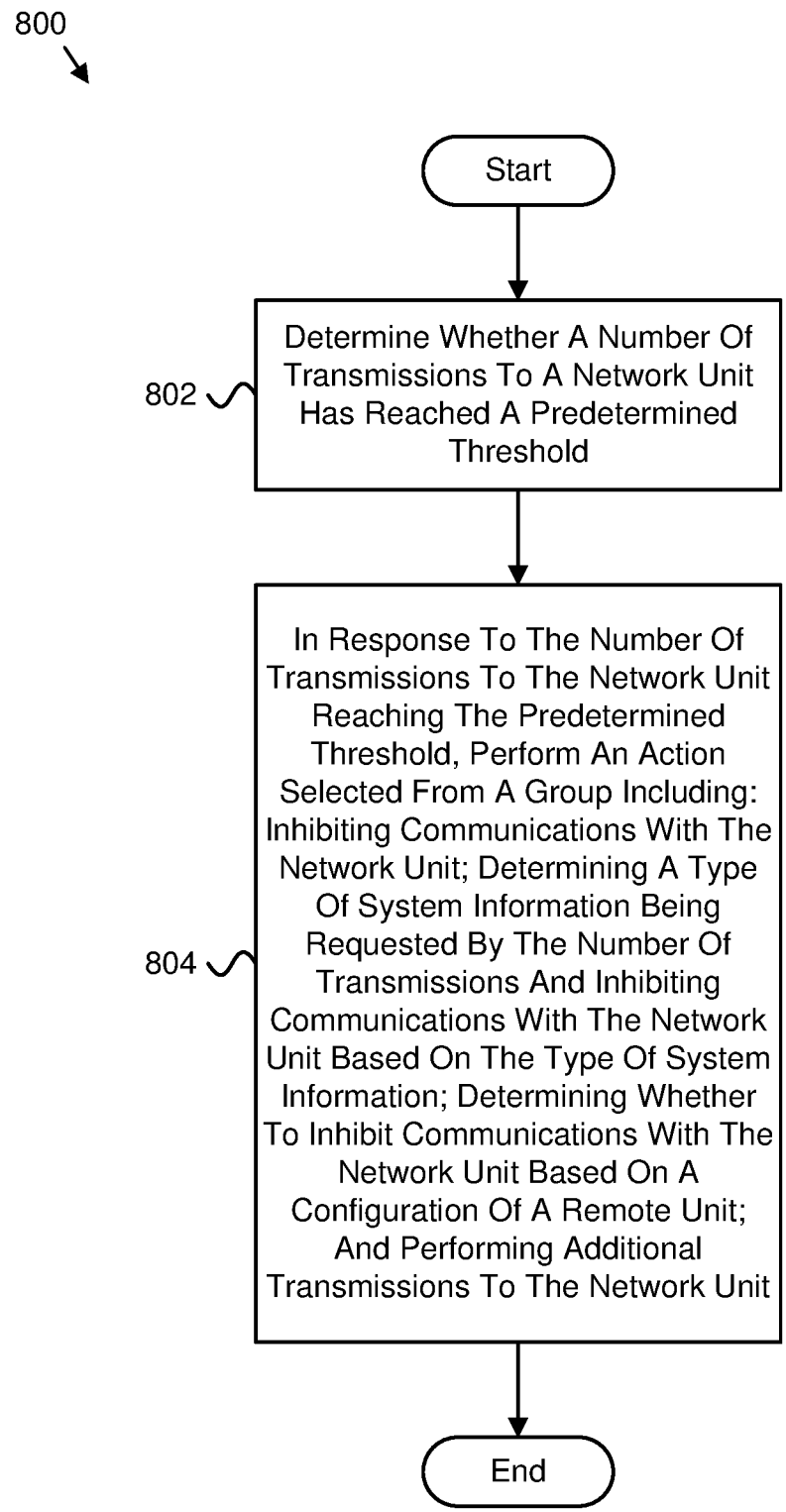
FIG. 8 is a schematic flow chart diagram illustrating one embodiment of a method for performing an action based on a number of transactions reaching a threshold.

FIG. 8 is a schematic flow chart diagram illustrating one embodiment of a method 800 for performing an action based on a number of transactions reaching a threshold. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include determining 802 whether a number of transmissions to a network unit 104 has reached a predetermined threshold. In certain embodiments, the method 800 includes, in response to the number of transmissions to the network unit 104 reaching the predetermined threshold, performing 804 an action selected from a group including: inhibiting communications with the network unit 104; determining a type of system information being requested by the number of transmissions and inhibiting communications with the network unit 104 based on the type of system information; determining whether to inhibit communications with the network unit 104 based on a configuration of a remote unit 102; and performing additional transmissions to the network unit 104.

In certain embodiments, the number of transmissions to the network unit 104 includes a number of times that a preamble is retransmitted to the network unit 104 without receiving an acknowledgment. In some embodiments, the method 800 includes receiving an indicator indicating the action to perform, wherein performing the action includes performing the action indicated by the indicator. In various embodiments, inhibiting the communications with the network unit 104 includes inhibiting the communications with the network unit 104 for a period of time.

In one embodiment, the method 800 includes receiving information indicating the period of time. In certain embodiments, inhibiting the communications with the network unit 104 includes reducing a ranking of the network unit 104. In some embodiments, reducing the ranking of the network unit 104 includes reducing the ranking of the network unit 104 for a period of time. In various embodiments, inhibiting the communications with the network unit 104 includes selecting a different network unit for communications.

In one embodiment, inhibiting the communications with the network unit 104 based on the type of system information includes: in response to the type of system information including essential system information, inhibiting the communications with the network unit 104 and selecting a different network unit for communications; and in response to the type of system information including non-essential system information, delaying the communications with the network unit 104 for a period of time.

In certain embodiments, inhibiting the communications with the network unit 104 based on the configuration of the remote unit 102 includes: in response to the number of transmissions corresponding to critical information for the remote unit 102, inhibiting the communications with the network unit 104 and selecting a different network unit 104 for communications; and in response to the number of transmissions corresponding to non-critical information for the remote unit 102, delaying the communications with the network unit 104 for a period of time. In some embodiments, performing the additional transmissions to the network unit 104 includes performing a predetermined number of additional transmissions to the network unit 104.

Figure 9:
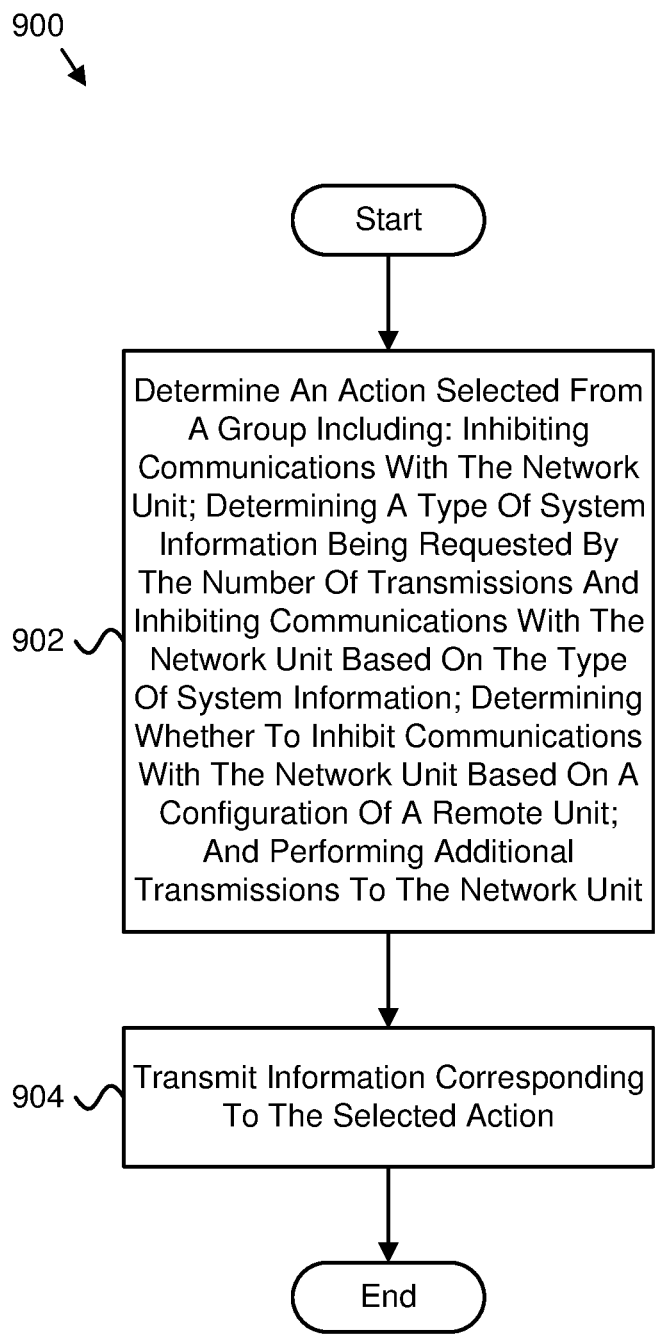
FIG. 9 is a schematic flow chart diagram illustrating another embodiment of a method for performing an action based on a number of transactions reaching a threshold.

FIG. 9 is a schematic flow chart diagram illustrating another embodiment of a method 900 for performing an action based on a number of transactions reaching a threshold. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include determining 902 an action selected from a group including: inhibiting communications with a network unit 104; determining a type of system information being requested by a number of transmissions and inhibiting communications with the network unit based on the type of system information; determining whether to inhibit communications with the network unit 104 based on a configuration of a remote unit 102; and performing additional transmissions to the network unit 104. In various embodiments, the method 900 includes transmitting 904 information corresponding to the selected action.

In certain embodiments, inhibiting the communications with the network unit 104 includes the remote unit 102 inhibiting the communications with the network unit 104 for a period of time. In some embodiments, the information includes an indication of the period of time. In various embodiments, inhibiting the communications with the network unit 104 includes the remote unit 102 reducing a ranking of the network unit 104. In one embodiment, the remote unit 102 reducing the ranking of the network unit 104 includes the remote unit 102 reducing the ranking of the network unit 104 for a period of time.

In certain embodiments, the information includes a reselection offset for reducing the ranking of the network unit 104. In some embodiments, the information includes a frequency based reselection priority for reducing the ranking of the network unit 104. In various embodiments, inhibiting the communications with the network unit 104 includes the remote unit 102 selecting a different network unit for communications. In one embodiment, inhibiting the communications with the network unit 104 based on the type of system information includes: in response to the type of system information including essential system information, the remote unit 102 inhibiting the communications with the network unit 104 and selecting a different network unit 104 for communications; and in response to the type of system information including non-essential system information, the remote unit 102 delaying the communications with the network unit 104 for a period of time.

In certain embodiments, inhibiting the communications with the network unit 104 based on the configuration of the remote unit 102 includes: in response to the number of transmissions corresponding to critical information for the remote unit 102, the remote unit 102 inhibiting the communications with the network unit 104 and selecting a different network unit 104 for communications; and in response to the number of transmissions corresponding to non-critical information for the remote unit 102, the remote unit 102 delaying the communications with the network unit 104 for a period of time. In some embodiments, performing the additional transmissions to the network unit 104 includes the remote unit 102 performing a predetermined number of additional transmissions to the network unit 104.

In various embodiments, transmitting the information corresponding to the selected action includes signaling parameters corresponding to the selected action to the remote unit 102. In one embodiment, signaling the parameters corresponding to the selected action to the remote unit 102 includes signaling the parameters using a broadcast channel. In certain embodiments, signaling the parameters corresponding to the selected action to the remote unit 102 includes signaling the parameters using a dedicated channel.

One method comprises: determining whether a number of transmissions to a network unit has reached a predetermined threshold; and in response to the number of transmissions to the network unit reaching the predetermined threshold, performing an action selected from a group comprising: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit.

In certain embodiments, the number of transmissions to the network unit comprises a number of times that a preamble is retransmitted to the network unit without receiving an acknowledgment.

In some embodiments, the method comprises receiving an indicator indicating the action to perform, wherein performing the action comprises performing the action indicated by the indicator.

In various embodiments, inhibiting the communications with the network unit comprises inhibiting the communications with the network unit for a period of time.

In one embodiment, the method comprises receiving information indicating the period of time.

In certain embodiments, inhibiting the communications with the network unit comprises reducing a ranking of the network unit.

In some embodiments, reducing the ranking of the network unit comprises reducing the ranking of the network unit for a period of time.

In various embodiments, inhibiting the communications with the network unit comprises selecting a different network unit for communications.

In one embodiment, inhibiting the communications with the network unit based on the type of system information comprises: in response to the type of system information comprising essential system information, inhibiting the communications with the network unit and selecting a different network unit for communications; and in response to the type of system information comprising non-essential system information, delaying the communications with the network unit for a period of time.

In certain embodiments, inhibiting the communications with the network unit based on the configuration of the remote unit comprises: in response to the number of transmissions corresponding to critical information for the remote unit, inhibiting the communications with the network unit and selecting a different network unit for communications; and in response to the number of transmissions corresponding to non-critical information for the remote unit, delaying the communications with the network unit for a period of time.

In some embodiments, performing the additional transmissions to the network unit comprises performing a predetermined number of additional transmissions to the network unit.

One apparatus comprises: a processor that: determines whether a number of transmissions to a network unit has reached a predetermined threshold; and in response to the number of transmissions to the network unit reaching the predetermined threshold, performs an action selected from a group comprising: inhibiting communications with the network unit; determining a type of system information being requested by the number of transmissions and inhibiting communications with the network unit based on the type of system information; determining whether to inhibit communications with the network unit based on a configuration of a remote unit; and performing additional transmissions to the network unit.

In certain embodiments, the number of transmissions to the network unit comprises a number of times that a preamble is retransmitted to the network unit without receiving an acknowledgment.

In some embodiments, an apparatus comprises a receiver that receives an indicator indicating the action to perform, wherein the processor performing the action comprises the processor performing the action indicated by the indicator.

In various embodiments, inhibiting the communications with the network unit comprises inhibiting the communications with the network unit for a period of time.

In one embodiment, an apparatus comprises a receiver that receives information indicating the period of time.

In certain embodiments, inhibiting the communications with the network unit comprises reducing a ranking of the network unit.

In some embodiments, reducing the ranking of the network unit comprises reducing the ranking of the network unit for a period of time.

In various embodiments, inhibiting the communications with the network unit comprises selecting a different network unit for communications.

In one embodiment, inhibiting the communications with the network unit based on the type of system information comprises: in response to the type of system information comprising essential system information, inhibiting the communications with the network unit and selecting a different network unit for communications; and in response to the type of system information comprising non-essential system information, delaying the communications with the network unit for a period of time.

In certain embodiments, inhibiting the communications with the network unit based on the configuration of the remote unit comprises: in response to the number of transmissions corresponding to critical information for the remote unit, inhibiting the communications with the network unit and selecting a different network unit for communications; and in response to the number of transmissions corresponding to non-critical information for the remote unit, delaying the communications with the network unit for a period of time.

In some embodiments, the processor performing the additional transmissions to the network unit comprises the processor performing a predetermined number of additional transmissions to the network unit.

One method comprises: determining an action selected from a group comprising: inhibiting communications with a network unit; determining a type of system information being requested by a number of transmissions and inhibiting communications with the network unit based on the type of system information; determining whether to inhibit communications with the network unit based on a configuration of a remote unit; and performing additional transmissions to the network unit; and transmitting information corresponding to the selected action.

In certain embodiments, inhibiting the communications with the network unit comprises the remote unit inhibiting the communications with the network unit for a period of time.

In some embodiments, the information comprises an indication of the period of time.

In various embodiments, inhibiting the communications with the network unit comprises the remote unit reducing a ranking of the network unit.

In one embodiment, the remote unit reducing the ranking of the network unit comprises the remote unit reducing the ranking of the network unit for a period of time.

In certain embodiments, the information comprises a reselection offset for reducing the ranking of the network unit.

In some embodiments, the information comprises a frequency based reselection priority for reducing the ranking of the network unit.

In various embodiments, inhibiting the communications with the network unit comprises the remote unit selecting a different network unit for communications.

In one embodiment, inhibiting the communications with the network unit based on the type of system information comprises: in response to the type of system information comprising essential system information, the remote unit inhibiting the communications with the network unit and selecting a different network unit for communications; and in response to the type of system information comprising non-essential system information, the remote unit delaying the communications with the network unit for a period of time.

In certain embodiments, inhibiting the communications with the network unit based on the configuration of the remote unit comprises: in response to the number of transmissions corresponding to critical information for the remote unit, the remote unit inhibiting the communications with the network unit and selecting a different network unit for communications; and in response to the number of transmissions corresponding to non-critical information for the remote unit, the remote unit delaying the communications with the network unit for a period of time.

In some embodiments, performing the additional transmissions to the network unit comprises the remote unit performing a predetermined number of additional transmissions to the network unit.

In various embodiments, transmitting the information corresponding to the selected action comprises signaling parameters corresponding to the selected action to the remote unit.

In one embodiment, signaling the parameters corresponding to the selected action to the remote unit comprises signaling the parameters using a broadcast channel.

In certain embodiments, signaling the parameters corresponding to the selected action to the remote unit comprises signaling the parameters using a dedicated channel.

One apparatus comprises: a processor that determines an action selected from a group comprising: inhibiting communications with a network unit; determining a type of system information being requested by a number of transmissions and inhibiting communications with the network unit based on the type of system information; determining whether to inhibit communications with the network unit based on a configuration of a remote unit; and performing additional transmissions to the network unit; and a transmitter that transmits information corresponding to the selected action.

In certain embodiments, inhibiting the communications with the network unit comprises the remote unit inhibiting the communications with the network unit for a period of time.

In some embodiments, the information comprises an indication of the period of time.

In various embodiments, inhibiting the communications with the network unit comprises the remote unit reducing a ranking of the network unit.

In one embodiment, the remote unit reducing the ranking of the network unit comprises the remote unit reducing the ranking of the network unit for a period of time.

In certain embodiments, the information comprises a reselection offset for reducing the ranking of the network unit.

In some embodiments, the information comprises a frequency based reselection priority for reducing the ranking of the network unit.

In various embodiments, inhibiting the communications with the network unit comprises the remote unit selecting a different network unit for communications.

In one embodiment, inhibiting the communications with the network unit based on the type of system information comprises: in response to the type of system information comprising essential system information, the remote unit inhibiting the communications with the network unit and selecting a different network unit for communications; and in response to the type of system information comprising non-essential system information, the remote unit delaying the communications with the network unit for a period of time.

In certain embodiments, inhibiting the communications with the network unit based on the configuration of the remote unit comprises: in response to the number of transmissions corresponding to critical information for the remote unit, the remote unit inhibiting the communications with the network unit and selecting a different network unit for communications; and in response to the number of transmissions corresponding to non-critical information for the remote unit, the remote unit delaying the communications with the network unit for a period of time.

In some embodiments, performing the additional transmissions to the network unit comprises the remote unit performing a predetermined number of additional transmissions to the network unit.

In various embodiments, the transmitter transmitting the information corresponding to the selected action comprises the transmitter signaling parameters corresponding to the selected action to the remote unit.

In one embodiment, the transmitter signaling the parameters corresponding to the selected action to the remote unit comprises the transmitter signaling the parameters using a broadcast channel.

In certain embodiments, the transmitter signaling the parameters corresponding to the selected action to the remote unit comprises the transmitter signaling the parameters using a dedicated channel.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
  determining whether a number of transmissions of a plurality of transmissions to a network unit has reached a predetermined threshold, wherein each transmission of the plurality of transmissions comprises a request for system information; and
  in response to the number of transmissions to the network unit reaching the predetermined threshold, performing two or more of the actions from a group comprising:
    inhibiting additional transmissions of the plurality of transmissions with the network unit so that additional requests for system information are not sent;
    determining a type of system information being requested by the number of transmissions and inhibiting additional transmissions of the plurality of transmissions with the network unit based on the type of system information;
    determining whether to inhibit additional transmissions of the plurality of transmissions with the network unit based on a configuration of a remote unit; and
    performing additional transmissions of the plurality of transmissions to the network unit so that additional requests for system information are sent.

2. The method of claim 1, wherein the number of transmissions to the network unit comprises a number of times that a preamble is retransmitted to the network unit without receiving an acknowledgment.

3. The method of claim 1, wherein inhibiting additional transmissions of the plurality of transmissions with the network unit comprises reducing a ranking of the network unit.

4. The method of claim 3, wherein reducing the ranking of the network unit comprises reducing the ranking of the network unit for a period of time.

5. The method of claim 1, wherein inhibiting additional transmissions of the plurality of transmissions with the network unit comprises selecting a different network unit for communications.

6. The method of claim 1, wherein inhibiting additional transmissions of the plurality of transmissions with the network unit based on the type of system information comprises:
in response to the type of system information comprising essential system information, inhibiting additional transmissions of the plurality of transmissions with the network unit and selecting a different network unit for communications; and
in response to the type of system information comprising non-essential system information, delaying additional transmissions of the plurality of transmissions with the network unit for a period of time.

7. The method of claim 1, wherein inhibiting additional transmissions of the plurality of transmissions with the network unit based on the configuration of the remote unit comprises:
in response to the number of transmissions corresponding to critical information for the remote unit, inhibiting additional transmissions of the plurality of transmissions with the network unit and selecting a different network unit for communications; and
in response to the number of transmissions corresponding to non-critical information for the remote unit, delaying additional transmissions of the plurality of transmissions with the network unit for a period of time.

8. An apparatus comprising:
a processor that:
determines whether a number of transmissions of a plurality of transmissions to a network unit has reached a predetermined threshold, wherein each transmission of the plurality of transmissions comprises a request for system information; and
in response to the number of transmissions to the network unit reaching the predetermined threshold, performs two or more of the actions from a group comprising:
inhibiting additional transmissions of the plurality of transmissions with the network unit so that additional requests for system information are not sent;
determining a type of system information being requested by the number of transmissions and inhibiting additional transmissions of the plurality of transmissions with the network unit based on the type of system information;
determining whether to inhibit additional transmissions of the plurality of transmissions with the network unit based on a configuration of a remote unit; and
performing additional transmissions of the plurality of transmissions to the network unit so that additional requests for system information are sent.

9. The apparatus of claim 8, further comprising a receiver that receives an indicator indicating the action to perform, wherein the processor performing the action comprises the processor performing the action indicated by the indicator.

10. The apparatus of claim 8, wherein inhibiting additional transmissions of the plurality of transmissions with the network unit comprises reducing a ranking of the network unit.

11. The apparatus of claim 10, further comprising a receiver that receives information indicating the period of time.

12. The apparatus of claim 8, wherein the processor performing the additional transmissions of the plurality of transmissions to the network unit comprises the processor performing a predetermined number of additional transmissions of the plurality of transmissions to the network unit.

13. A method comprising:
determining two or more of the actions from a group comprising
inhibiting additional transmissions of the plurality of transmissions with a network unit so that additional requests for system information are not sent;
determining a type of system information being requested by a number of transmissions and inhibiting additional transmissions of the plurality of transmissions with the network unit based on the type of system information;
determining whether to inhibit additional transmissions of the plurality of transmissions with the network unit based on a configuration of a remote unit; and
performing additional transmissions of the plurality of transmissions to the network unit so that additional requests for system information are sent; and
transmitting information corresponding to the selected action.

14. The method of claim 13, wherein inhibiting additional transmissions of the plurality of transmissions with the network unit comprises the remote unit selecting a different network unit for communications.

15. An apparatus comprising:
a processor determines two or more of the actions from a group comprising
inhibiting additional transmissions of the plurality of transmissions with a network unit so that additional requests for system information are not sent;
determining a type of system information being requested by a number of transmissions and inhibiting additional transmissions of the plurality of transmissions with the network unit based on the type of system information;
determining whether to inhibit additional transmissions of the plurality of transmissions with the network unit based on a configuration of a remote unit; and
performing additional transmissions of the plurality of transmissions to the network unit so that additional requests for system information are sent; and
a transmitter that transmits information corresponding to the selected action.

16. The apparatus of claim 15, wherein inhibiting additional transmissions of the plurality of transmissions with the network unit comprises the remote unit inhibiting the communications with the network unit for a period of time.

17. The apparatus of claim 16, wherein the information comprises an indication of the period of time.

18. The apparatus of claim 15, wherein the transmitter transmitting the information corresponding to the selected action comprises the transmitter signaling parameters corresponding to the selected action to the remote unit.

19. The apparatus of claim 18, wherein the transmitter signaling the parameters corresponding to the selected action to the remote unit comprises the transmitter signaling the parameters using a broadcast channel.

20. The apparatus of claim 18, wherein the transmitter signaling the parameters corresponding to the selected action to the remote unit comprises the transmitter signaling the parameters using a dedicated channel.

* * * * *